(12) United States Patent
Ito (10) Patent No.: US 6,671,343 B1
(45) Date of Patent: Dec. 30, 2003

(54) DATA CLOCK GENERATOR, DATA CLOCK GENERATING METHOD, AND STORAGE MEDIUM THEREFOR

(75) Inventor: Tsugio Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/479,697

(22) Filed: Jan. 7, 2000

(30) Foreign Application Priority Data

Jan. 14, 1999 (JP) .......................................... 11-008190

(51) Int. Cl.[7] ............................. H03D 3/24; G06F 13/14
(52) U.S. Cl. ......................................... 375/376; 710/58
(58) Field of Search ........................... 375/376; 710/58; 713/500–503; 386/96; 327/148–149; 369/50

(56) References Cited

U.S. PATENT DOCUMENTS

| | | | | |
|---|---|---|---|---|
| 5,815,634 A | * | 9/1998 | Daum et al. ................... 386/96 |
| 5,901,149 A | * | 5/1999 | Itakura et al. ............... 370/468 |
| 6,041,090 A | * | 3/2000 | Chen ........................... 375/376 |
| 6,215,742 B1 | * | 4/2001 | Kuroda et al. ........... 369/47.28 |
| 6,381,660 B1 | * | 4/2002 | Ito ............................... 710/58 |

FOREIGN PATENT DOCUMENTS

JP    11-313107    *    9/1999    ........... H04L/12/56

* cited by examiner

Primary Examiner—Stephen Chin
Assistant Examiner—Lawrence Williams
(74) Attorney, Agent, or Firm—Pillsbury Winthrop LLP (57) ABSTRACT

A data clock generator, a data clock generating method and a storage medium therefor are provided, which make it possible to reduce burden on a PLL circuit and substantially reduce jitter in the generated data clock signal, as well as achieve a sufficiently wide lock range of the PLL circuit. Data packets are supplied, which include at least a plurality of data samples and time stamps which are smaller in number than the number of the plurality of data samples. Time samples are generated, respectively, for the data samples from the time stamps of the supplied data packets. A PLL circuit generates a data clock signal based on the time samples for the respective data samples.

8 Claims, 8 Drawing Sheets

DATA CLOCK GENERATOR, DATA CLOCK GENERATING METHOD, AND STORAGE MEDIUM THEREFOR

BACKGROUND OF THE INVENTION

1. Field of the Invention

This invention relates to a data clock generator and a data clock generating method that generate data clocks of a plurality of data samples at least from data packets comprised of the data samples and time stamps smaller in number than the number of the data samples, and a storage medium therefor.

2. Prior Art

Figure 1:
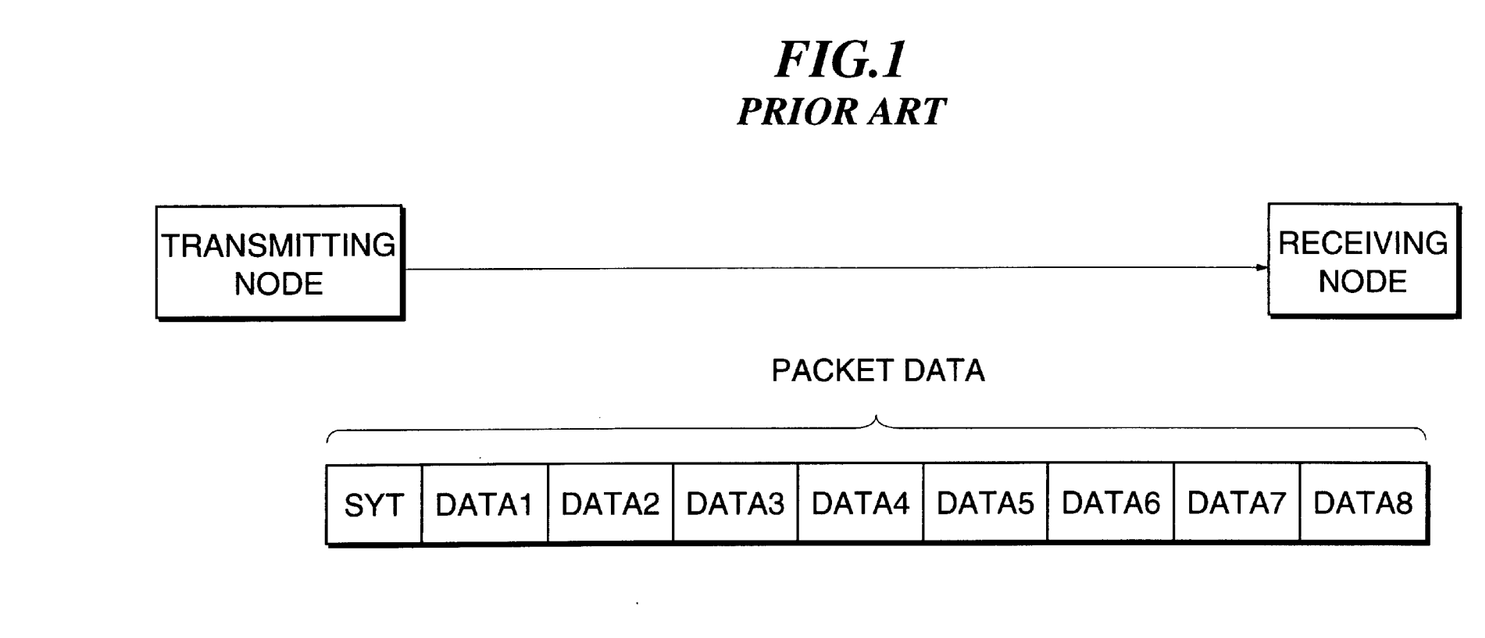
FIG. 1 is a diagram schematically illustrating how audio data packets conforming to the standard IEEE 1394 are transmitted from a transmitting node to a receiving node.

When a plurality of data samples are transmitted in packets, time stamps smaller in number than the number of the data samples are added to the data samples to reduce the amount of data of the packets. For instance, in audio data packets conforming to the standard IEEE 1394, a single time stamp (SYT) is attached to eight samples (or sixteen samples) of audio data, to form packet data transmitted from a transmitting node to a receiving node, as shown in FIG. 1.

Figure 2:
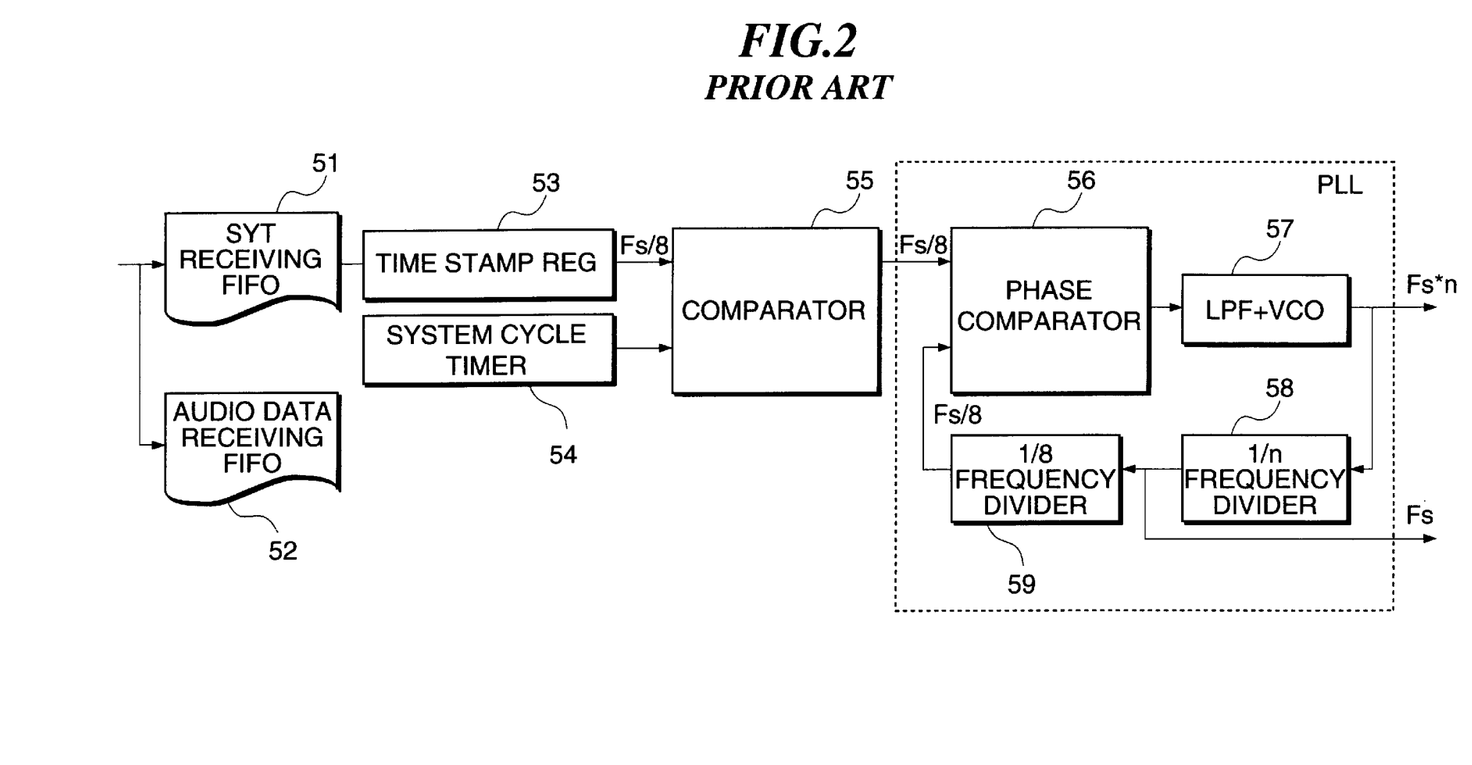
FIG. 2 is a block diagram showing the arrangement of a conventional IEEE 1394 interface used in the receiving node appearing in FIG. 1.

FIG. 2 shows part of the arrangement of a conventional IEEE 1394 interface at the receiving node.

In FIG. 2, audio data packets sent from the transmitting node are separated into time stamp portions and data sample portions, and stored in an SYT receiving FIFO (First-In First-Out) memory 51 and an audio data receiving FIFO memory 52, respectively. Time-sequential time stamps stored in the SYT receiving FIFO memory 51 are sequentially delivered in the order of older ones in predetermined timing to a time stamp register 53 for temporary storage, and then inputted to one input terminal of a comparator 55. Since only one time stamp is attached to every eight samples, the frequency of generation of time stamps corresponds to one eighth of the frequency Fs of a sampling clock signal (hereinafter referred to as the word clock") for reading (or generating) each data sample. The other input terminal of the comparator 55 receives an output from a system cycle timer 54. The system cycle timer 54 generates a time count accurately representative of the frequency Fs of the word clock (hereinafter referred to as the "word clock frequency"). The comparator 55 compares each time stamp and each time count from the system cycle timer 54, and delivers one pulse to one input terminal of a phase comparator 56 when the time stamp and the time count agree with each other. The phase comparator 56, a low-pass filter (LPF)+voltage controlled oscillator (VCO) 57, a 1/n frequency divider 58, and a ⅛ frequency divider 59 constitute a phase-locked loop (PLL) circuit. A sampling clock signal (this sampling clock signal is a clock signal for reading each bit of each data sample, and hence hereinafter referred to as the "bit clock") generated by the LPF+VCO 57, which has a frequency of n times the frequency Fs (the value n indicates the number of bits of bit data forming each data sample, and ranges e.g. from 64 to 256), is frequency-divided by the 1/n frequency divider 58, and thereby converted back into a sampling clock signal having the work clock frequency Fs which is then further frequency-divided by the ⅛ frequency divider 59 into a clock signal having a frequency of one eighth of the word clock frequency Fs, i.e. a time stamp-generating frequency Fs/8. The phase comparator 56 calculates a phase difference between the clock signal having the frequency Fs/8 and the clock signal having the frequency Fs/8 delivered from the comparator 55, and generates a voltage commensurate with the phase difference, i.e. a voltage for controlling the VCO, which is then smoothed by the LPF, and applied to the VCO.

Thus, two kinds of accurate clock signals, i.e. the word clock having the frequency Fs and the bit clock having the frequency Fs×n, are generated, and delivered to a circuit at a subsequent stage.

In the conventional data clock generator, however, the PLL circuit generates the word clock and the bit clock with reference to the frequency which is one eighth of the word clock frequency Fs (one sixteenth of the same when each packet contains sixteen data samples). Therefore, if the number n of bits of each data sample is e.g. any one of 64 to 256, the PLL circuit is required to generate a clock signal having 512 to 2048 (or 1024 to 4096) times the frequency of the input signal (pulse signal from the comparator 55). This necessitates the use of a high-precision PLL circuit, and hence increases the manufacturing cost of the data clock generator. Further, it is impossible to substantially reduce jitter in the clock signal generated, and achieve a sufficiently wide lock range of the PLL circuit.

SUMMARY OF THE INVENTION

It is an object of the present invention to provide a data clock generator and a data clock generating method which are capable of reducing burden on a PLL circuit and substantially reducing jitter in the generated data clock signal, as well as achieving a sufficiently wide lock range of the PLL circuit, and a storage medium therefor.

To attain the above object, according to a first aspect of the present invention, there is provided a data clock generator comprising a supply device that supplies data packet including at least a plurality of data samples and time stamps which are smaller in number than a number of the plurality of data samples, a time sample-generating device that generates time samples for respective ones of the data samples, from the time stamps of the data packets supplied from the supply device, and a PLL circuit that generates a data clock signal based on the time samples for the respective ones of the data samples generated by the time sample-generating device.

Preferably, the data clock signal comprises a word clock for reading each of the data samples, and a bit clock for reading each bit data of each of the data samples.

Preferably, each of the data packets comprises a plurality of data samples and one time stamp, each of the time samples being generated based on a difference between a time stamp of a present one of the data packets and a time stamp of an immediately preceding one of the data packets.

More preferably, each of the time samples is generated based on a quotient obtained by dividing the difference by the number of the plurality of data samples of each of the data packets.

Further preferably, each of the time samples is generated by sequentially adding a zero-fold value of the quotient to a n−1 fold value thereof to the time stamp of the immediately preceding one of the data packets.

To attain the above object, according to a second aspect of the invention, there is provided a storage medium storing a program that is executable by a computer, the program comprising a supply module for supplying data packets including at least a plurality of data samples and time stamps which are smaller in number than a number of the plurality of data samples, a time sample-generating module for generating time samples for respective ones of the data samples, from the time stamps of the data packets supplied by the supply module, and a data clock-generating module for causing a PLL circuit to generate a data clock signal based on the time samples for the respective ones of the data samples generated by the time sample-generating module.

To attain the above object, according to a third aspect of the invention, there is provided a data clock generating method comprising the steps of supplying data packets including at least a plurality of data samples and time stamps which are smaller in number than a number of the plurality of data samples, generating time samples for respective ones of the data samples, from the time stamps of the supplied data packets, and causing a PLL circuit to generate a data clock signal based on the time samples for the respective ones of the generated data The above and other objects, features, and advantages of the invention will become more apparent from the following detailed description taken in conjunction with the accompanying drawings.

DETAILED DESCRIPTION

The present invention will now be described in detail with reference to drawings showing an embodiment thereof.

Figure 3:
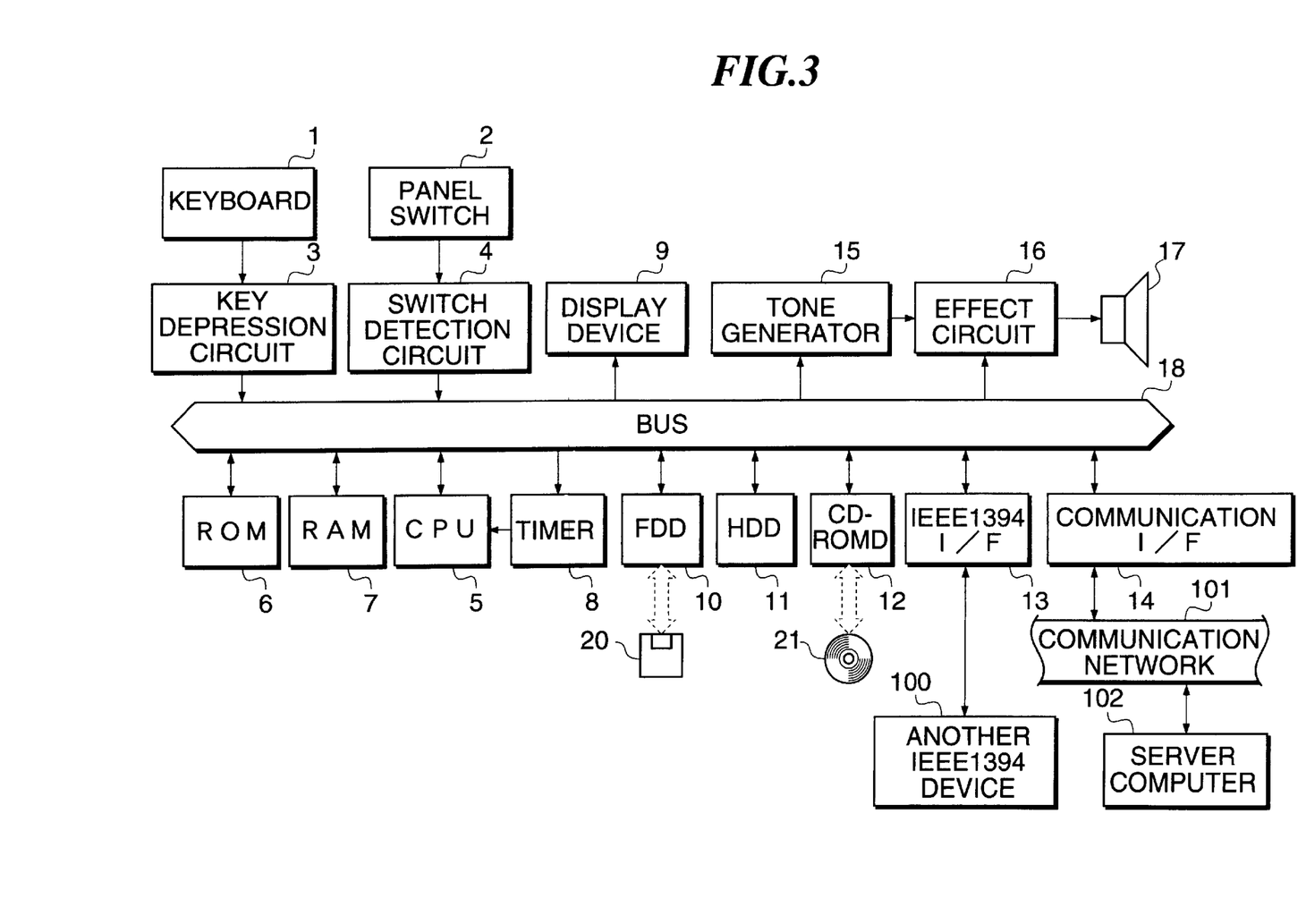
FIG. 3 is a block diagram schematically showing the arrangement of a parameter value-setting apparatus incorporating a data clock generator according to an embodiment of the present invention.

Referring first to FIG. 3, there is schematically shown the whole arrangement of a parameter-setting apparatus incorporating a data clock generator according to an embodiment of the present invention. As shown in FIG. 3, the parameter-setting apparatus is comprised of a keyboard 1 for inputting pitch information of musical tones, a panel switch composed of a plurality of switches for inputting various kinds of information, a key depression-detecting circuit 3 for detecting depression of each key of the keyboard 1, a switch detection circuit 4 for detecting depression of each switch of the panel switch 2, a CPU 5 for controlling the whole apparatus, a ROM 6 storing a control program to be executed by the CPU 5, table data, etc., a RAM 7 for temporarily storing performance data, various kinds of input information, computational results, etc., a timer 8 for counting a timer interrupt time in a timer interrupt handing process and other various times, a display device 9 composed of a large-sized liquid crystal display (LCD) or a cathode ray tube (CRT) and light emitting diodes (LEDs), for displaying various information items, a floppy disk drive (FDD) 10 for driving a floppy disk (FD) 20 as a storage medium, a hard disk drive (HDD) 11 for driving a hard disk, not shown, storing application programs including the control program, and various data items, a CDROM drive 12 for driving a compact disk-read only memory (CD-ROM) 21 storing application programs which may include the above-mentioned control program, and various data items, an IEEE 1394 interface (I/F) 13 for receiving signals of an IEEE 1394 format from an external device or apparatus and sending out a signal of the IEEE 1394 format, a communication interface (I/F) 14 for sending and receiving data e.g. to and from a server computer 102 via a communication network 101, a tone generator 15 for converting performance data inputted from the keyboard 1, preset performance data or the like into a musical tone signal, an effect circuit 16 for applying various effects to the musical tone signal from the tone generator 15, and a sound system 17 composed e.g. of a digital-to-analog converter (DAC), an amplifier, and loud speakers, for converting the musical tone signal into musical tones.

The above-mentioned components 3 to 16 are connected to each other by a bus 18, with the timer 8 connected to the CPU 5, another IEEE 1394 device connected to the IEEE 1394 I/F 13, the communication network 101 connected to the communication I/F 14, the effect circuit 16 connected to the tone generator 15, and the sound system 17 connected to the effect circuit 16.

The hard disk of the HDD 11 may store, as described above, a control program to be executed by the CPU 5. If the ROM 6 does not store the control program, it is possible to cause the CPU 5 to operate just in the same way as when the ROM 6 stores the control program, by storing the control program in the hard disk beforehand and causing the CPU 5 to read them into the RAM 7. This makes it easy to add a control program or upgrade the same.

The control program and various data items read from the CD-ROM 21 inserted in the CD-ROM drive 12 are stored in the hard disk of the HDD 11. This makes it easy to add a control program or upgrade the same. It should be noted that any other devices than the CD-ROM drive 12 such as a magneto-optic disk (MO) may be provided as an external storage device so as to enable various forms of media to be used.

The communication interface I/F 14 is connected, as described above, to the communication network 101 which may be e.g. a local area network (LAN), the Internet, or a phone line or the like, and further connected, via the communication network 101, to the server computer 102. When the above-mentioned programs and various parameters are not stored in the hard disk of the HDD 11, the communication I/F 14 is used to download them from the server computer 102. A client computer (the parameter-setting apparatus in the present embodiment) sends a command requesting download of the programs and parameters via the communication I/F 14 and the communication network 101 to the server computer 102. Responsive to the command, the server computer 102 delivers the requested programs and parameters to the client computer via the communication network 101. The client computer receives the programs and parameters via the communication I/F 14 and stores them in the hard disk within the HDD 11, thereby completing the download.

In addition to the above components, an interface may be provided for direct transfer of data to and from an external computer or the like.

Although the parameter-setting apparatus incorporating the data clock generator according to the embodiment is implemented by a general-purpose personal computer (PC) having a standard hardware configuration, as described above, this is not limitative but it may be implemented by a mobile PC which is not equipped with the FDD 10 or the CD-ROM 12. Further, the apparatus may be implemented by a dedicated machine alternatively to a general-purpose PC.

Figure 4A:
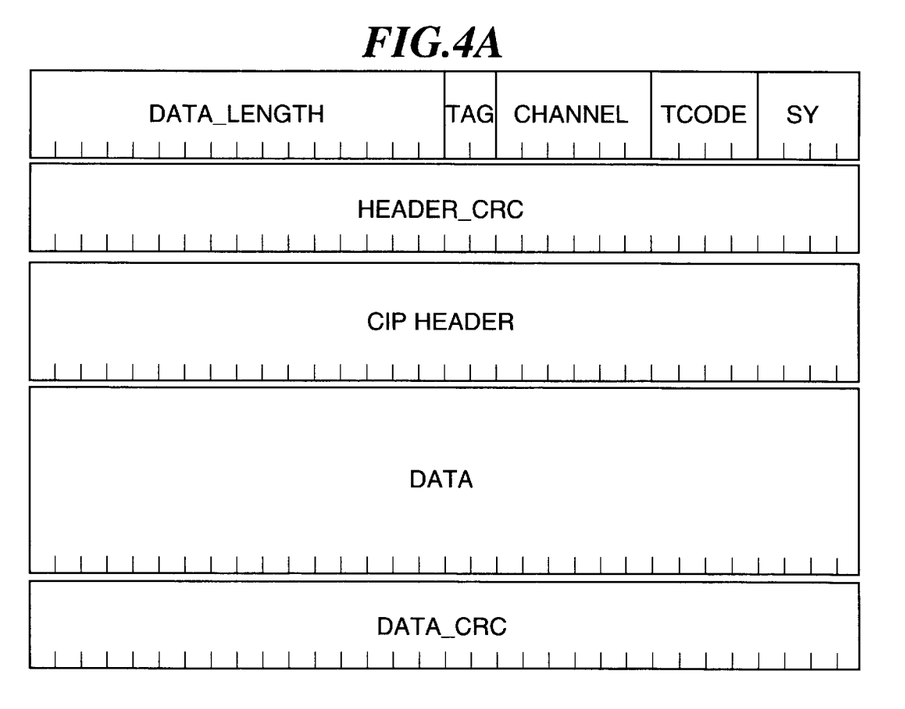
FIG. 4A is a diagram showing a format of an isochronous packet of the standard IEEE 1394.
Figure 4B:
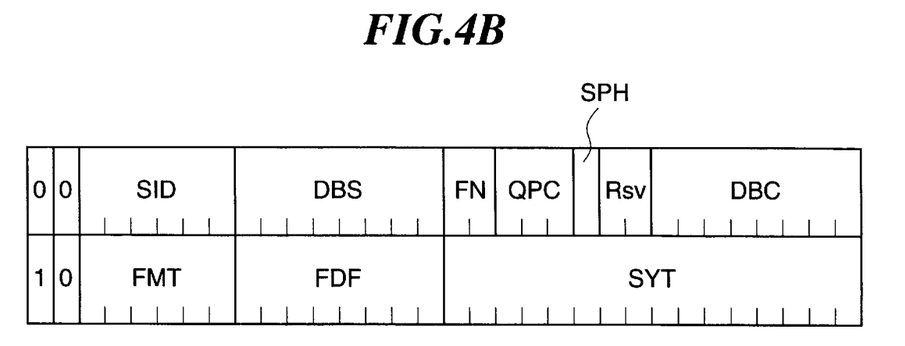
FIG. 4B is a diagram showing a data format of a CIP field of the isochronous packet.

FIG. 4A shows a format of an isochronous packet according to IEEE 1394, and FIG. 4B shows a data format of a CIP field of the isochronous packet.

There are two types of data transfer methods conforming to the standard IEEE 1394; an isochronous data transfer method and an asynchronous data transfer method. According to the isochronous data transfer method, one packet of data is transferred every predetermined repetition period (125 µs), and according to the asynchronous data transfer method, one packet of data is transferred at a desired time (in this method, however, data transfer is not allowed when data transfer by the isochronous data transfer method is being executed). In the present embodiment, the isochronous data transfer method is employed to send and receive each packet of data.

As shown in FIG. 4A, the isochronous packet is comprised of a data_length field, a tag field, a channel field, a tcode field, a sy field, a header_CRC field, a CIP Header field, a data field, and a data_CRC field.

The data_length field stores data indicative of the data length of a data block of the packet, the tag field stores data indicative of a kind of this packet (e.g. when the packet is a common isochronous packet (CIP), "01" is stored), the channel field stores a channel number of the packet, the tcode field stores a transaction code, the sy field stores a synchronization code, the header_CRC field stores a cyclic redundancy check (CRC), the CIF header field stores data in the format shown in FIG. 4B, the data field stores eight (or sixteen) pieces (samples) of data (audio data in the present embodiment), and the data_CRC field stores the CRC of the data.

As shown in FIG. 4B, the CIP header is comprised of a plurality of fields, out of which a SYT (System Time) field alone is used for storing a time stamp in the present embodiment, and therefore the description of the SYT field alone will be given hereinbelow while the description of the other fields is omitted.

The SYT field stores a time stamp for data contained in the packet, i.e. a time stamp for a first piece of data in the data field. In the present embodiment, a value of each time stamp is expressed in terms of "(cycle count value)·(cycle offset value)", and in the SYTn field of each packet n (n=0, 1, . . . ) of a series of packets, there are stored the following time stamp values:

SYT0: 0.000

SYT1: 1.3FF

SYT2: 2.800

SYT3: 4.000 et seq. wherein the value of each time stamp is expressed in hexadecimal digits.

Figure 5:
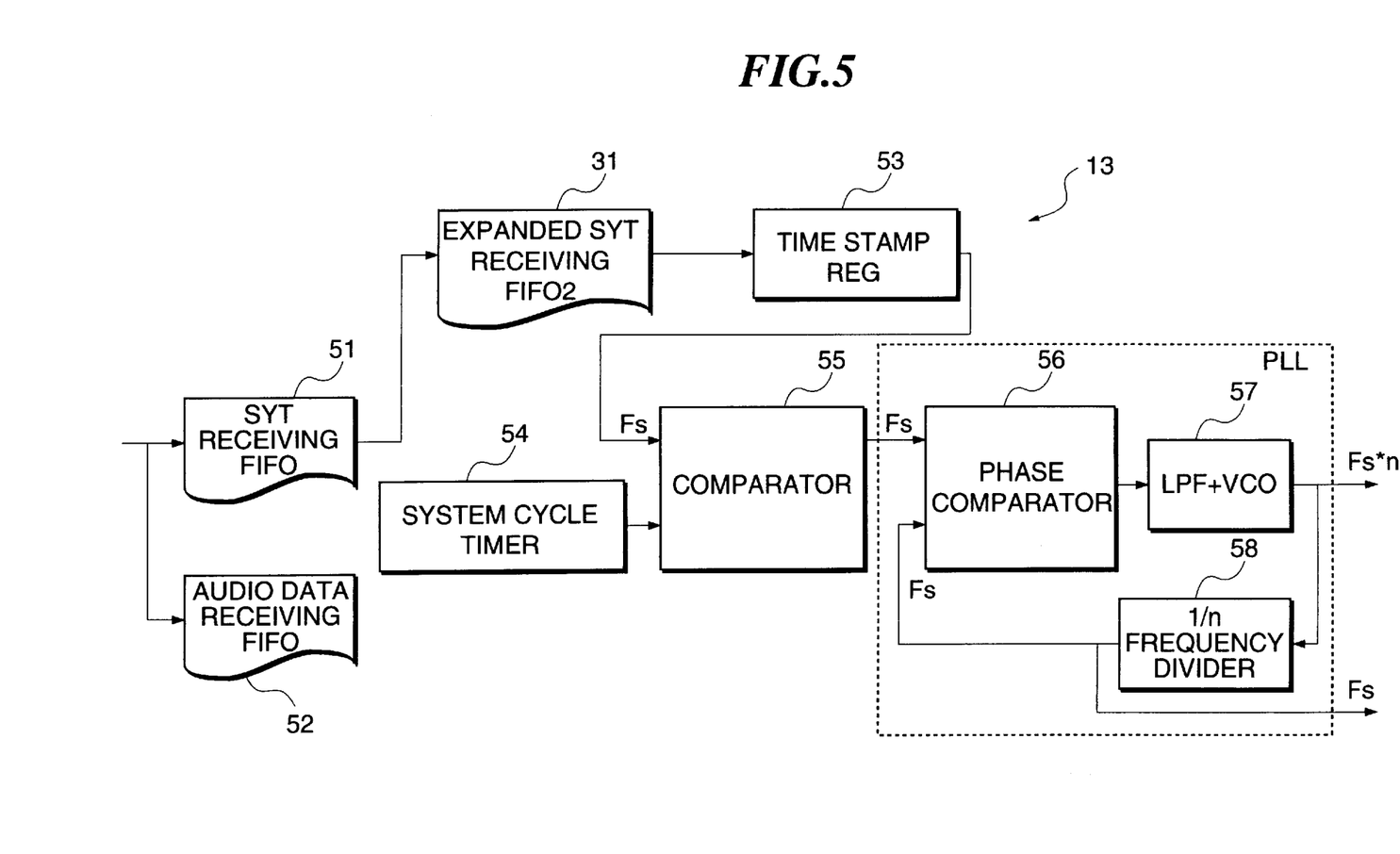
FIG. 5 is a block diagram showing the arrangement of a part of an IEEE 1394 I/F appearing in FIG. 3.

FIG. 5 shows the arrangement of a part of the IEEE 1394 I/F 13, which corresponds to the part of the conventional one shown in FIG. 2. In FIG. 5, components corresponding to ones appearing in FIG. 2 are designated by identical reference numerals, and detailed description thereof is omitted.

The FIG. 5 IEEE 1394 I/F of the present embodiment is distinguished from the FIG. 2 IEEE 1394 I/F in that an expanded SYT receiving FIFO memory 31 is additionally provided, and the ⅛ frequency-divider 59 is eliminated from the FIG. 2 IEEE 1394 I/F. That is, the expanded SYT receiving FIFO memory is inserted between the SYT receiving FIFO memory 51 and the time stamp register 53.

The expanded SYT receiving FIFO memory 31 is for storing time stamps SYT for respective eight pieces of audio data contained in the immediately preceding packet, which are generated based on the immediately preceding time stamp SYT and the present time stamp SYT stored in the SYT receiving FIFO memory 51.

The provision of the expanded SYT receiving FIFO memory 31 enables the PLL circuit to generate a word clock and a bit clock with reference to the word clock frequency Fs.

Figure 6:
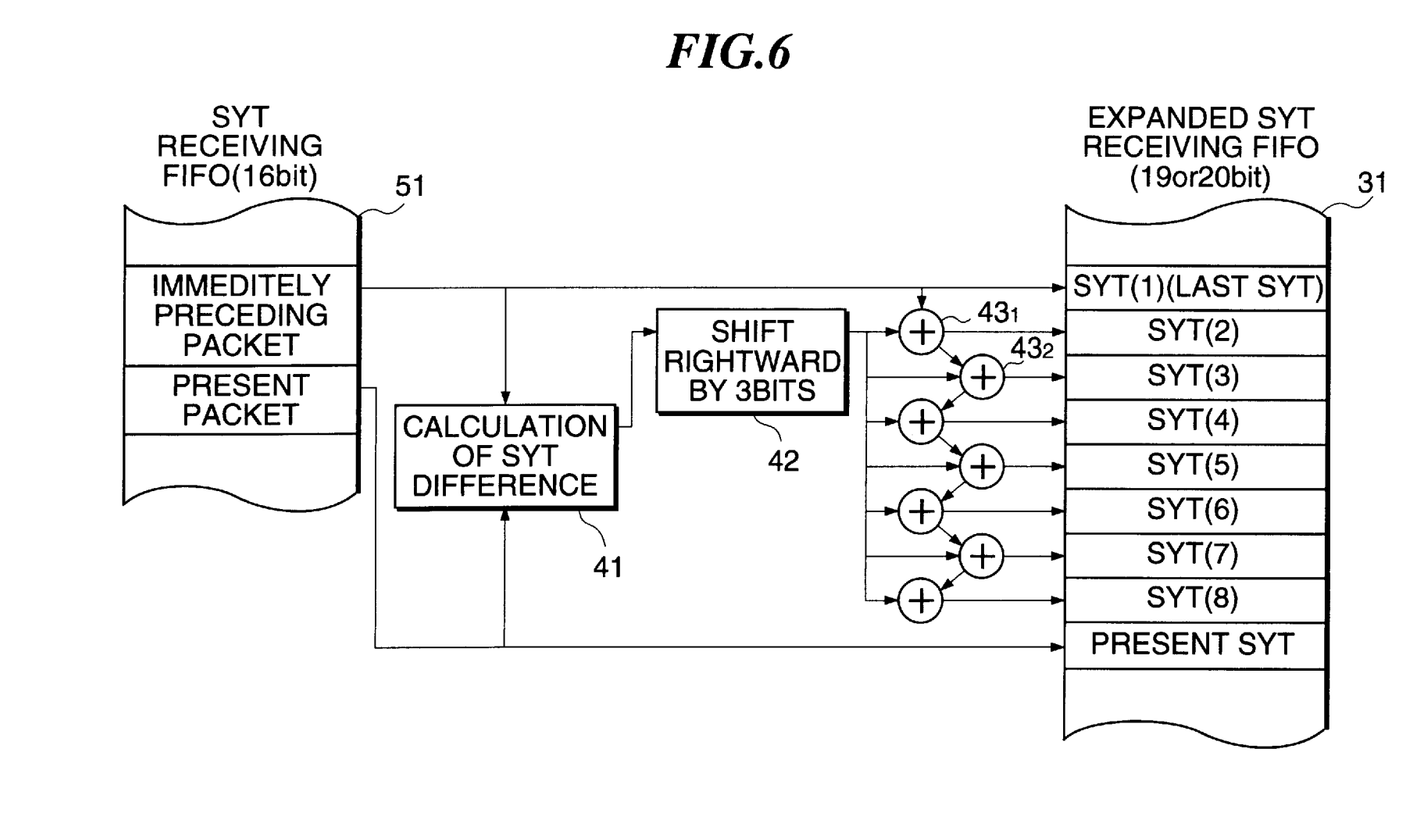
FIG. 6 is a hardware-based representation of a control process carried out by the FIG. 3 data clock generator.
Figure 7:
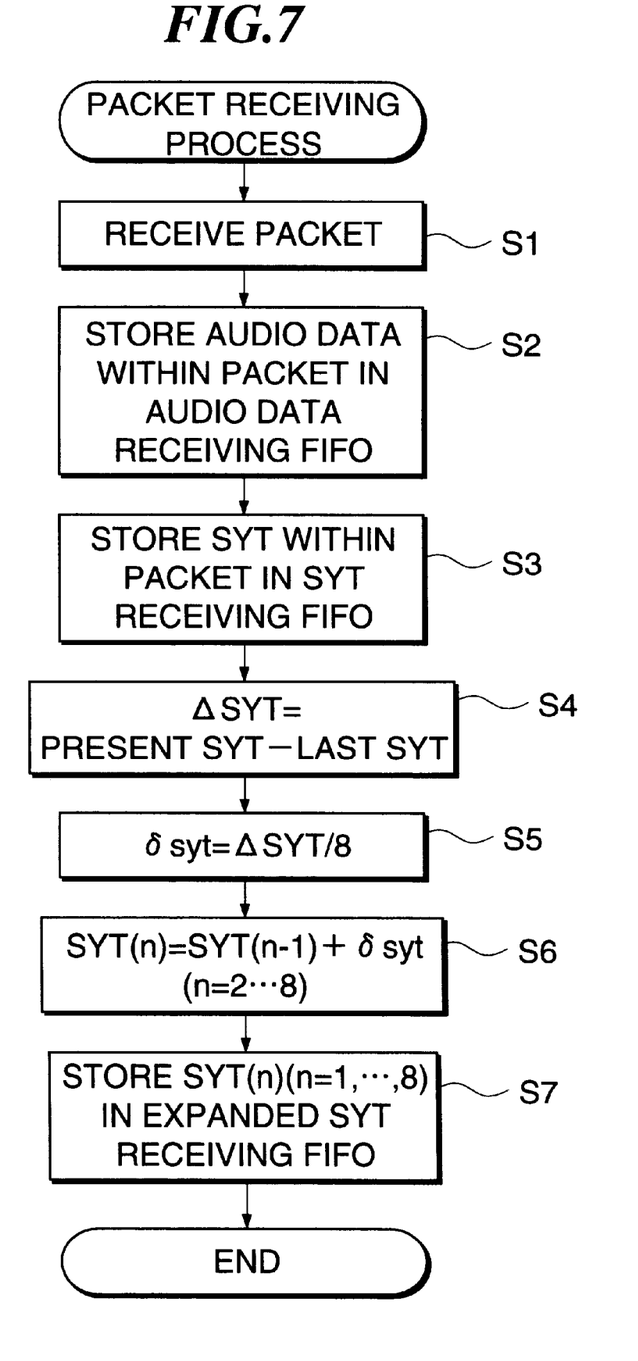
FIG. 7 is a flowchart showing a process of receiving packet data, which is carried out by the FIG. 3 data clock generator, particularly a CPU thereof.

A control process executed by the data clock generator constructed as above will be first described based on hardware implementing the data clock generator with reference to FIG. 6, and then based on software implementing the same with reference to FIG. 7.

FIG. 6 shows the control process executed by the data clock generator of the present embodiment, which is represented in the form of hardware.

As shown in FIG. 6, the difference between the immediately preceding SYT value and the present SYT value stored in the SYT receiving FIFO memory 51 is calculated (functional block 41), and the calculated difference is shifted rightward or in a less significant direction by three bits (four bits when sixteen pieces of audio data are contained in the packet), whereby the difference is reduced to one eighth of the difference calculated by the functional block 41 (one sixteenth when sixteen pieces of audio data are contained in the packet) (functional block 42). The immediately preceding SYT value is stored as it is in a corresponding area SYT(1) of the expanded SYT receiving FIFO memory 31, and the sum or result of addition of the immediately preceding SYT value and the one eighth of the difference by an adder $43_1$ is stored in a corresponding area SYT(2) of the expanded SYT receiving FIFO memory 31. Further, the sum or result of addition of the abovementioned sum (value stored in the area SYT(2)) and the one eighth of the difference by an adder $43_2$ is stored in a corresponding area SYT(3) of the expanded SYT receiving FIFO memory 31. Thereafter, results of addition carried out in the same manner as described above are sequentially stored in respective corresponding areas SYT(4) to SYT(8) of the expanded SYT receiving FIFO memory 31.

In the above described manner, the SYT values corresponding respectively to the eight pieces of audio data contained in the immediately preceding packet are generated and stored in the expanded SYT receiving FIFO memory 31.

It should be noted that, as described hereinabove with reference to FIG. 5, the expanded SYT receiving FIFO memory 31 is directly connected to the SYT receiving FIFO memory 51, and therefore, in the present embodiment, the operations of the above-mentioned functional blocks 41 and 42 and the adders $43_1$ and $43_2$ are executed by the CPU 5 in a manner described below. More specifically, the above operations are not implemented by hardware, but implemented by software, and results of the operations effected by the software are stored in S7 as shown in FIG. 7. Of course, this is not limitative, but the operations may be implemented by hardware as shown in FIG. 6.

FIG. 7 shows a routine for carrying out a control process for receiving packet data, which is executed by the data clock generator of the present embodiment, particularly by the CPU 5.

First, in FIG. 7, a packet is received at a step S1. Then, audio data within the packet is stored in the audio data receiving FIFO memory 52 at a step 52, and at the same time a time stamp SYT within the packet is stored in the SYT receiving FIFO memory 51 at a step S3.

Then, the difference ΔSYT (=present SYT—last SYT) between the present SYT value and the immediately preceding SYT value is calculated at a step S4, and the difference ΔSYT is shifted rightward by three bits (four bits when sixteen pieces of audio data are contained in the packet), whereby the difference is reduced to one eighth (one sixteenth when sixteen pieces of audio data are contained in the packet). That is, $\delta\,\mathrm{syt}=\Delta\mathrm{SYT}/8$ is calculated at a step S5.

Then, the following calculation is carried out at a step S6 using the following equation:

$$\mathrm{SYT}(n)=\mathrm{SYT}(n-1)+\delta\mathrm{syt}(n=2,\ldots \qquad (8)$$

The result SYT(n) (n=1, ..., 8, provided that SYT(1)= immediately preceding SYT) of the calculation is stored in a corresponding area of the expanded SYT receiving FIFO memory 31 at a step S7, followed by terminating the program.

At the above steps S6 and S7, all the eight values SYT(n) (n=1, ..., 8) may be calculated first, and then the calculated values may be simultaneously stored in respective corresponding areas of the expanded SYT receiving FIFO memory 31. Alternatively, each value SYT(n) (n=1, ..., 8) may be stored in a corresponding area of the expanded SYT receiving FIFO memory 31 whenever it is calculated.

In the above described manner, the SYT values for the respective eight pieces of audio data contained in the packet are generated, and stored in the expanded SYT receiving FIFO memory 31.

Thus, according to the present embodiment, the SYT values corresponding respectively to the eight pieces of audio data contained in the immediately preceding packet are stored in the expanded SYT receiving FIFO memory 31, and inputted to the comparator 55 via the time stamp register 53. The comparator 55 and the PLL circuit at the following stage cooperate to generate the word clock and the bit clock with reference to the frequency Fs. Therefore, the PLL circuit of the present embodiment is only required to generate a clock signal having a frequency which is one eighth (or one sixteenth) times the frequency of the clock signal generated by the PLL circuit incorporated in the conventional data clock generator, and hence load on the PLL circuit can be reduced. This makes it possible to reduce jitter in the generated data clock signal, and achieve a sufficiently wide lock range of the PLL circuit.

Figure 8:
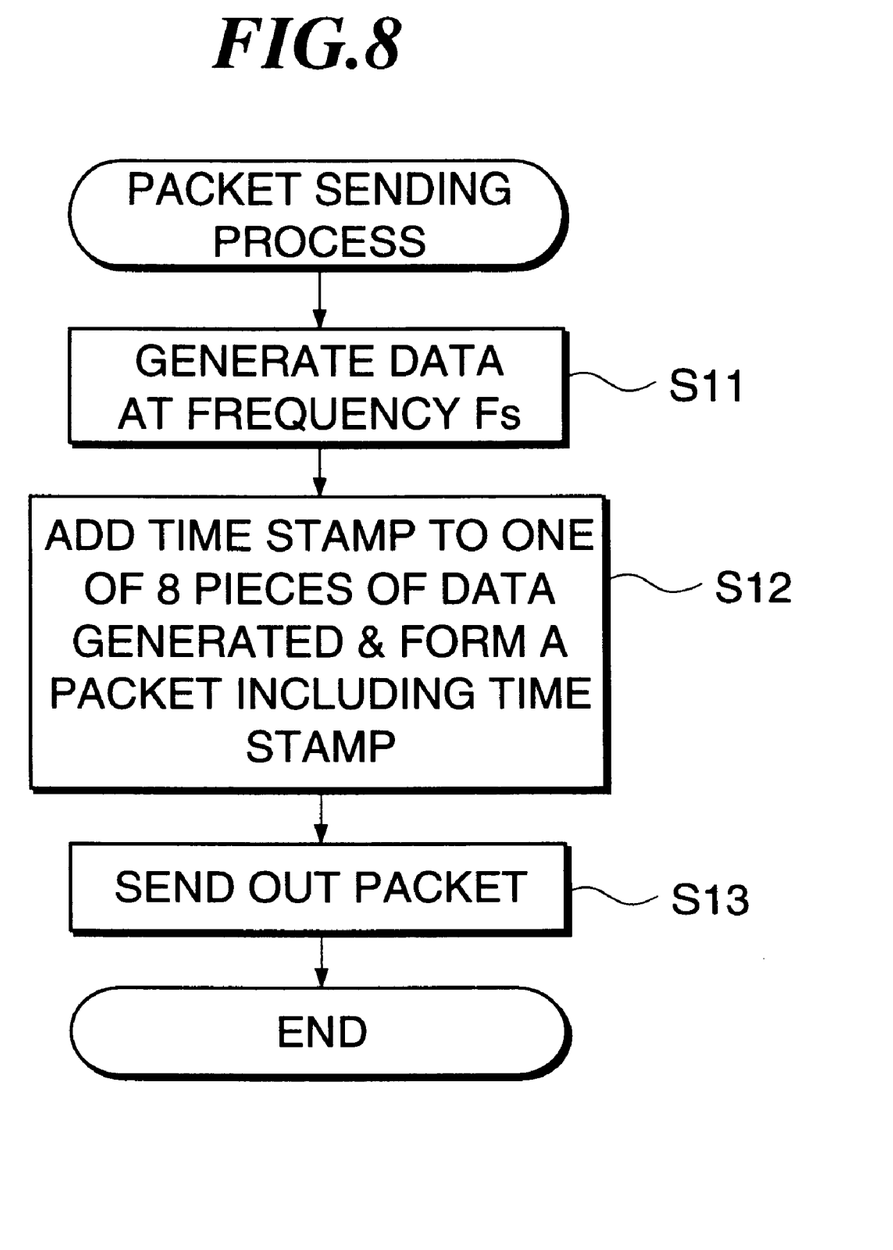
FIG. 8 is a flowchart showing a process of sending packet data, which is carried out by the FIG. 1 data clock generator.

FIG. 8 shows a routine for carrying out a control process for transmitting packet data, which is executed by the data clock generator of the present embodiment.

First, audio data are read or generated in synchronism with the frequency FS at a step S11.

When a set of eight pieces of audio data are generated, a time stamp is added to one of them, and the eight pieces of audio data with the time stamp are formed into a packet at a step S12, and sent out at a step S13, followed by terminating the program.

Although the data clock generator according to the present embodiment generates a data clock signal based on IEEE 1394 isochronous packets, particularly audio data packets, this is not limitative, but the present invention may be applied to any data clock generator in which the PLL circuit generates a data clock signal based on time stamps within packets, the time stamps in each packet being smaller in number than the number of data samples in the packet. Further, the data to which time stamps are attached is not limited to packet data.

Further, it goes without saying that the object of the present invention can be also attained by supplying a storage medium storing a software program implementing the functions of the above described embodiment to a system or apparatus, and causing a computer (or CPU or MPU) of the system or the apparatus to read the program stored in the storage medium for execution of the program.

In this case, the program itself read from the storage medium implements the novel functions of the present invention, and hence the storage medium storing the program constitutes the present invention.

The storage medium for supplying the program may include a hard disk in the HDD 11, the CD-ROM 21, an MO, an MD, the floppy disk 20, a CD-R (CD-recordable), a magnetic tape, a nonvolatile memory card, a ROM, and so forth. Further, the program may be supplied from the other IEEE 1394 device 100 or from the server computer 102 via the communication network 101.

Furthermore, it goes without saying that the present invention encompasses not only a case in which the functions of the above described embodiment are realized by a computer which reads and executes the program, but also a case in which a part or all of the operations are carried out by an operating system (OS) or the like running on the computer based on instructions of the program, thereby realizing the functions of the above described embodiment.

Moreover, it goes without saying that the present invention encompasses a case in which the program read from the storage medium is once written into a memory provided in a function expansion board inserted in the computer or a function expansion unit connected to the computer, and based on instructions of the program, the CPU 5 incorporated in the function expansion board or function expansion unit carries out a part or all of the above operations, thereby realizing the functions of the above described embodiment.

What is claimed is:

1. A data clock generator comprising:
   a supply device that supplies data packets including at least a plurality of data samples and time stamps which are smaller in number than a number of said plurality of data samples;
   a time stamp-generating device that generates new time stamps for respective ones of said data samples, from said time stamps of said data packets supplied from said supply device; and
   a PLL circuit that generates a data clock signal based on said new time stamps for the respective ones of said data samples generated by said new time stamp-generating device.

2. A data clock generator according to claim 1, wherein said data clock signal comprises a word clock for reading each of said data samples, and a bit clock for reading each bit data of each of said data samples.

3. A data clock generator comprising:
   a supply device that supplies data packets, each of said data packets comprises a plurality of data samples and one time stamps;
   a time stamp-generating device that generates new time stamps for respective ones of said data samples, from said time stamps of said data packets supplied from said supply device, each of said new time stamps being generated based on a difference between a time stamp of a present one of said data packets and a time stamp of an immediately preceding one of said data packets; and
   a PLL circuit that generates a data clock signal based on said new time stamps for the respective ones of said data samples generated by said time stamp-generating device.

4. A data clock generator according to claim 3, wherein each of said time stamps is generated based on a quotient obtained by dividing said difference by the number of said plurality of data samples of each of said data packets.

5. A data clock generator according to claim 4, wherein each of said time stamps is generated by sequentially adding a zero-fold value of said quotient to a n−1 fold value thereof to said time stamp of the immediately preceding one of said data packets.

6. A storage medium storing a program that is executable by a computer, the program comprising:
- a supply module for supplying data packets including at least a plurality of data samples and time stamps which are smaller in number than a number of said plurality of data samples;
- a time stamp-generating module for generating new time stamps for respective ones of said data samples, from said time stamps of said data packets supplied by said supply module; and
- a data clock-generating module for causing a PLL circuit to generate a data clock signal based on said new time stamps for the respective ones of said data samples generated by said time stamp-generating module.

7. A storage medium according to claim 6, wherein said data clock signal comprises a word clock for reading each of said data samples, and a bit clock for reading each bit data of each of said data samples.

8. A data clock generating method comprising the steps of:

supplying data packets including at least a plurality of data samples and time stamps which are smaller in number than a number of said plurality of data samples;

generating time stamps for respective ones of said new data samples, from said time stamps of the supplied data packets; and causing a PLL circuit to generate a data clock signal based on said new time stamps for the respective ones of the generated data samples.

* * * * *